(12) United States Patent
Ui et al.

(10) Patent No.: US 8,673,423 B2
(45) Date of Patent: Mar. 18, 2014

(54) FOAMING COMPOSITION FOR FILLING, FOAMING MEMBER FOR FILLING, AND FOAM FOR FILLING

(75) Inventors: Takehiro Ui, Osaka (JP); Youhei Hayashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 75 days.

(21) Appl. No.: 13/064,374

(22) Filed: Mar. 22, 2011

(65) Prior Publication Data

US 2011/0244212 A1    Oct. 6, 2011

(30) Foreign Application Priority Data

Mar. 30, 2010    (JP) ................................ 2010-078007

(51) Int. Cl.
    *B32B 3/00*    (2006.01)
(52) U.S. Cl.
    USPC ................. 428/71; 428/76; 521/95; 521/142
(58) Field of Classification Search
    USPC ................. 428/71, 76; 521/95, 142
    See application file for complete search history.

(56) References Cited

U.S. PATENT DOCUMENTS

| | | | |
|---|---|---|---|
| 4,446,254 A * | 5/1984 | Nakae et al. | 521/50.5 |
| 4,659,746 A * | 4/1987 | Topcik | 521/89 |
| 6,197,841 B1 * | 3/2001 | Takimoto et al. | 521/144 |
| 6,706,802 B2 | 3/2004 | Carlson et al. | |
| 7,199,165 B2 | 4/2007 | Kassa et al. | |
| 2004/0249009 A1 * | 12/2004 | Homma et al. | 521/134 |
| 2007/0276054 A1 | 11/2007 | Ui et al. | |
| 2010/0087558 A1 | 4/2010 | Ui | |

FOREIGN PATENT DOCUMENTS

| | | |
|---|---|---|
| JP | 10-310654 | 11/1998 |
| JP | 2007-314755 A | 12/2007 |
| JP | 2009-057474 | 3/2009 |
| JP | 2009-91558 | 4/2009 |
| WO | WO 2009038015 A1 * | 3/2009 |

OTHER PUBLICATIONS

Ian Manners et al., "Ferrocene-Backbone Polymers", Polymeric Materials Encyclopedia, 1996, pp. 2301, 2556, 2557, 2560, 2561, vol. 4, F-G, CRC Press, Inc., Boca Raton, FL.
Shau-Tarng Lee et al., Polymeric Foams, Science and Technology, 2007, Taylor & Francis Group, LLC, Boca Raton, FL.
Japanese Notification of Reasons for Refusal, which issued on Dec. 10, 2013 in connection with Japanese Patent Application No. 2010-078007.

* cited by examiner

*Primary Examiner* — Hai Vo
(74) *Attorney, Agent, or Firm* — Jean C. Edwards, Esq.; Edwards Neils PLLC

(57) ABSTRACT

A foaming composition for filling contains a polymer, an organic peroxide, and azodicarbonamide, and a viscosity thereof measured at a temperature of 120° C. and under a pressure of 500 MPa with a flow tester is in a range of 1050 to 4950 Pa·s.

6 Claims, 2 Drawing Sheets

(a)

(b)

FOAMING COMPOSITION FOR FILLING, FOAMING MEMBER FOR FILLING, AND FOAM FOR FILLING

CROSS-REFERENCE TO RELATED APPLICATION

The present application claims priority from Japanese Patent Application No. 2010-078007 filed on Mar. 30, 2010, the content of which is hereby incorporated by reference into this application.

BACKGROUND OF THE INVENTION

1. Field of the Invention

The present invention relates to a foam for filling, which is used to fill a gap between various members, an inner space of a hollow member, or the like, and a foaming member for filling and a foaming composition for filling each for forming the foam for filling.

2. Description of the Related Art

Conventionally, it has been known to fill a hollow space of a hollow member, which is formed as a closed cross section of an automotive pillar or the like, with a foam as a filler for the purpose of preventing the vibration and noise of an engine, wind noise, and the like from being transmitted to a vehicle interior.

For example, it has been proposed that a foaming composition for filling containing ethylene-vinyl acetate copolymer, ethylene-ethyl acrylate copolymer, dicumyl peroxide, and azodicarbonamide is prepared, and heated to be foamed (see, for example, Japanese Patent Publication No. 2009-91558).

SUMMARY OF THE INVENTION

However, the foaming composition for filling of Japanese Patent Publication No. 2009-91558 may result in an insufficient filling property in the hollow space of the hollow member depending on the shape of the hollow member.

An object of the present invention is to provide a foaming composition for filling which can ensure an excellent filling property, a foaming member for filling using the same, and a foam for filling obtained by foaming the foaming composition for filling.

A foaming composition for filling of the present invention contains a polymer, an organic peroxide, and azodicarbonamide, wherein a viscosity measured at a temperature of 120° C. and under a pressure of 500 MPa with a flow tester is in a range of 1050 to 4950 Pa·s.

It is preferable that the foaming composition for filling of the present invention further contains 1 to 20 parts by weight of a (meth)acryloyl-group-containing compound having at least three (meth)acryloyl groups based on 100 parts by weight of the organic peroxide.

In the foaming composition for filling of the present invention, it is preferable that a melt flow rate of the polymer measured based on JIS K 7210 is in a range of not less than 1.0 g/10 min and not more than 5.0 g/10 min.

A foaming member for filling of the present invention includes the foregoing foaming composition for filling and a fitting member attached to the foregoing foaming composition for filling to be capable of being mounted in an inner space of a hollow member.

A foam for filling of the present invention is obtained by foaming the foregoing foaming composition for filling.

In the foaming composition for filling of the present invention, the viscosity measured at the specified temperature and under the specified pressure in the flow tester is within a specified range. As a result, stable foaming can be achieved by heating.

Therefore, it is possible to give an excellent filling property to the foaming member for filling of the present invention including the foaming composition for filling, and reliably and satisfactorily fill the inner space of the hollow member with the foam for filling of the present invention.

DETAILED DESCRIPTION OF THE INVENTION

Figure 1:
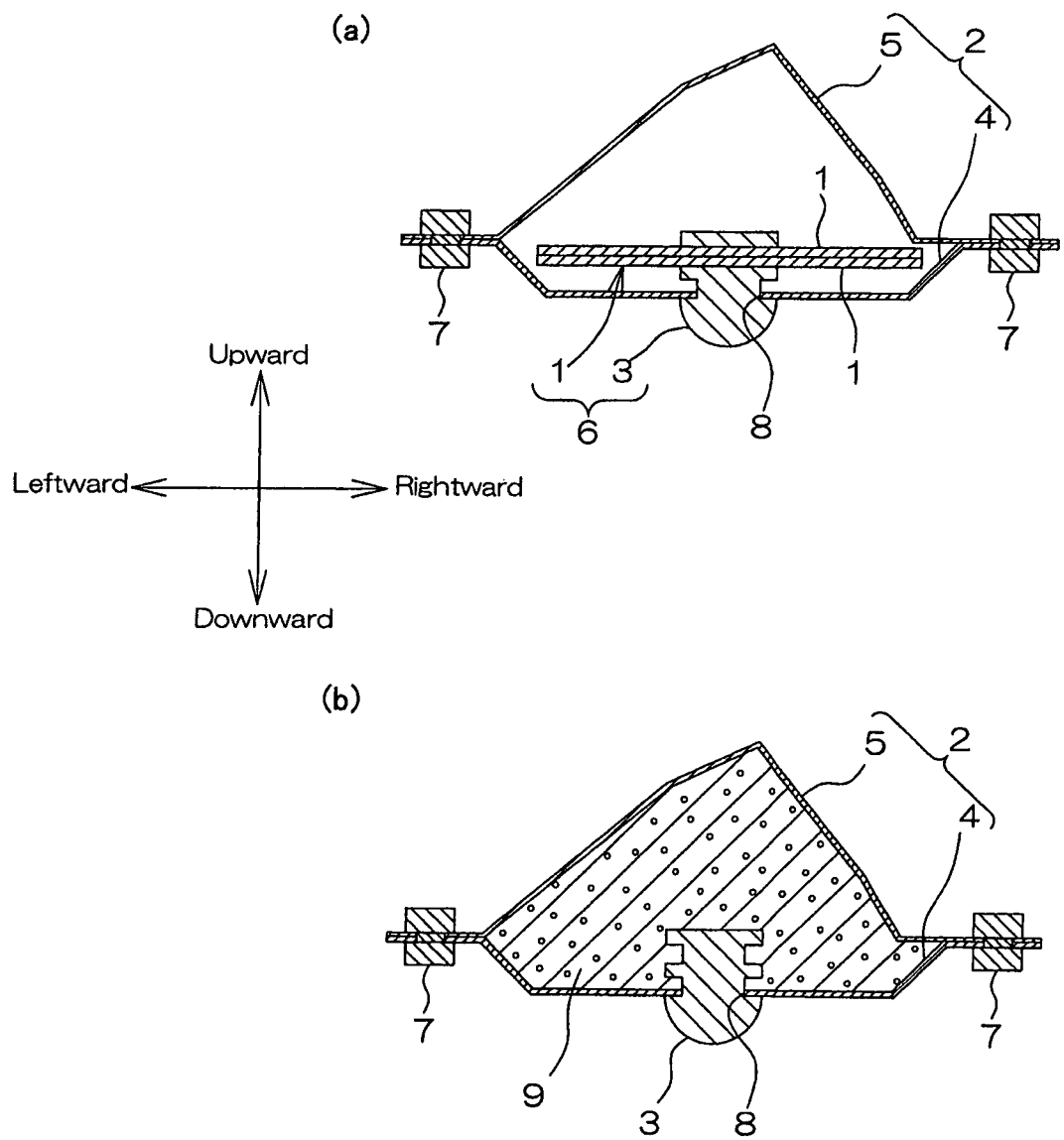
FIG. 1 is a process step view of a method of filling an inner space of an automotive pillar using an embodiment of a foaming composition for filling, a foaming member for filling, and a foam for filling of the present invention, (a) showing the step of attaching a fitting member to the foaming composition for filling to produce the foaming member for filling, and placing the foaming member for filling in the pillar, and (b) showing the step of foaming, cross-linking, and curing the foaming composition for filling by heating to fill the inner space of the pillar with the foam for filling.

A foaming composition for filling of the present invention contains a polymer, an organic peroxide, and azodicarbonamide.

Examples of the polymer include resins (thermoplastic resins) such as ethylene-vinyl acetate copolymer (EVA), ethylene-ethyl acrylate copolymer (EEA), ethylene-butyl acrylate copolymer (EBA), olefin resin (such as polyethylene or polypropylene), polyester, polyvinyl butyral, polyvinyl chloride, polyamide and polyketone, and rubbers such as styrene butadiene rubber (SBR), butadiene rubber (BR), and ethylene propylene diene rubber (EPDM).

These polymers may be used alone or in combination of two or more kinds.

As the polymer, the resin is preferably used. More preferably, the EVA and/or EEA is used.

EVA is a copolymer of ethylene and vinyl acetate, and has a vinyl acetate content (VA content) in a range of, e.g., 10 to 60 wt %, or preferably 15 to 45 wt %.

EEA is a copolymer of ethylene and ethyl acrylate, and has an ethyl acrylate content (EA content measured by a MDP method) in a range of, e.g., 16 to 35 wt %, or preferably 20 to 30 wt %.

Each of the polymers has a melt flow rate (MFR) in a range of, e.g., not more than 5.0 g/10 min, or preferably not more than 4.5 g/10 min and, e.g., not less than 1.0 g/10 min, or preferably not less than 1.5 g/10 min.

The MFR of the polymer is measured based on JIS K 7210. Specifically, the MFR is measured with a capillary rheometer at 190° C. under a load of 2.16 kg (pressure of 6.1 MPa).

When the MFR of the polymer is outside the range shown above, the viscosity (viscosity measured with a flow tester described later) of the foaming composition for filling may not be able to be set within a desired range.

The organic peroxide is a cross-linking agent for cross-linking the polymer, which is, e.g., a radical producing agent decomposed by heating to produce a free radical and allow cross-linking of the polymer. Examples of the organic peroxide include dicumyl peroxide (DCP), 1,1-di-tertiary-butylperoxy-3,3,5-tri-methyl-cyclohexane, 2,5-dimethyl-2,5-ditertiary-butyl-peroxyhexane, 1,3-bis(tertiary-butyl-peroxyisopropyl)benzene, tertiary-butyl-peroxyketone, and tertiary-butyl-peroxybenzoate.

These organic peroxides may be used alone or in combination of two or more kinds.

As the organic peroxide, DCP is preferably used.

The blending proportion of the organic peroxide based on 100 parts by weight of the polymer is in a range of, e.g., 0.1 to 10 parts by weight, or preferably 0.5 to 5 parts by weight. When the blending proportion of the organic peroxide is less than the range shown above, a viscosity increase due to cross-linking is small, and foam breakage may occur due to a gas pressure during foaming. When the blending proportion of the organic peroxide exceeds the range shown above, excessive cross linking occurs, a coating of the polymer suppresses the gas pressure during foaming, and foaming at a high expansion ratio may be less likely to occur.

Azodicarbonamide (ADCA) is a foaming agent for foaming the polymer.

When azodicarbonamide is used, an amount of gas generated during foaming is sufficiently large, and the foaming composition for filling with excellent foamability can be obtained. More specifically, an amount of gas generated from azodicarbonamide is 270 ml/g, and an expansion ratio higher than those obtained with other foaming agents such as 4,4'-oxybis(benzene sulfonyl hydrazide) (OBSH), from which gas is generated in an amount of 120 ml/g, can be ensured. Therefore, azodicarbonamide has excellent economic efficiency.

The blending proportion of azodicarbonamide based on 100 parts by weight of the polymer is in a range of, e.g., 5 to 3 parts by weight, or preferably 10 to 25 parts by weight. When the blending proportion of azodicarbonamide is less than the range shown above, the obtained foaming composition for filling has a low expansion ratio. To fill a gap between members or an inner space of a hollow member, a foaming member for filling obtained from the foaming composition for filling needs to be formed in a large shape, and assemblability may deteriorate. When the blending proportion of azodicarbonamide exceeds the range shown above, an expansion ratio commensurate with the blending proportion cannot be obtained, and a cost disadvantage may occur.

In the present invention, a functional-group-containing compound and/or a softener may also be blended in the foaming composition for filling.

The functional-group-containing compound is a cross-linking auxiliary agent for the organic peroxide (cross-linking agent), and is blended as necessary to adjust (enhance) the degree of cross-linking and ensure a high expansion ratio.

Specifically, the functional-group-containing compound is a compound having at least three functional groups.

Examples of the functional group contained in the functional-group containing compound include (meth)acryloyl group (i.e., acryloyl group (—COCH=$CH_2$) and/or methacryloyl group (—COC($CH_3$)=$CH_2$), allyl group (—$CH_2$CH=$CH_2$), hydroxyimino grow (=N—OH), imino group (=NH), amino group (—$NH_2$), imide group (—CO—NH—CO—), carboxyl group (—COOH), and vinyl group (—CH=$CH_2$). Preferably, the (meth)acryloyl group is contained.

Specific examples of the functional-group-containing compound include (meth)acryloyl-group-containing compounds (i.e., acryloyl-group-containing compound and/or methacryloyl-group-containing compound) such as trimethylol propane triacrylate (TMPTA), trimethylol propane tri(meth)acrylate (TMPTMA), pentaerythritol tri(meth)acrylate, pentaerythritol tetra(meth)acrylate, and dipentaerythritol hexa(meth)acrylate, allyl-group-containing compounds such as triallyl isocyanurate (TAIC) and triallyl cyanurate (TAC), hydroxyimino-group-containing compounds (e.g., oximes) such as p-quinone dioxime, imino- and amino-group-containing compounds such as guanidine, imide-group-containing compounds such as N,N'-m-phenylene bismaleimide, carboxyl-group-containing compounds (e.g., unsaturated fatty acid metal salts) such as zinc acrylate, and vinyl-group-containing compounds such as 1,2-polybutadiene.

These functional-group-containing compounds may be used alone or in combination of two or more kinds.

As the functional-group-containing compound, the (meth)acryloyl-group-containing compound is preferably used.

By using the (meth)acryloyl-group-containing compound, strong cross-linking due to a (meth)acryloyl group can be achieved.

The blending proportion of the functional-group-containing compound based on 100 parts by weight of the organic peroxide is in a range of, e.g., 1 to 20 parts by weight, or preferably 2 to 15 parts by weight. On the other hand, the blending proportion of the functional-group-containing compound based on 100 parts by weight of the polymer is in a range of, e.g., 0.05 to 1.5 parts by weight, or preferably 0.1 to 1.0 parts by weight.

When the blending proportion of the functional-group-containing compound exceeds the range shown above, the viscosity (viscosity measured with the flow tester) of the foaming composition for filling may exceed a desired range. On the other hand, when the blending proportion of the functional-group-containing compound is less than the range shown above, cross-linking due to the organic peroxide may not be able to be sufficiently accelerated, and foam breakage may occur to degrade the filling property of the foam for filling.

The softener is blended as necessary to soften the polymer, and set the foaming composition for filling to a desired viscosity. Examples of the softener include drying oils and animal/vegetable oils (such as e.g., paraffins (such as paraffin-based oils), waxes, naphtenes, aromatic oils, asphalts, and flaxseed oils), petroleum-derived oils, terpene polymers, rosin-based resins, terpene-based resins, coumarone-indene-based resins, petroleum-based resins (such as, e.g., aliphatic hydrocarbon resins, aliphatic/aromatic hydrocarbon resins, and aromatic hydrocarbon resins), organic acid esters (e.g., phthalates, phosphoric acid esters, higher fatty acid esters, and alkylsulfonic acid esters), and tackifiers.

Examples of the softener also include low-viscosity resins among the polymers shown above.

Specific examples of the low-viscosity resins include resins each having a MFR in a range in excess of 5.0 g/10 min (described later), or preferably not less than 50 g/10 min, and normally not more than 1000 g/10 min.

When the MFR of the resin is less than the range shown above, the polymer may not be able to be sufficiently softened.

In the softener, a softening temperature measured according to JIS K 2207 is in a range of, e.g., 85 to 125° C., or preferably 90 to 120° C.

Specifically, the softening temperature is measured by a ring and ball method in which the temperature is increased at a rate of 5° C./min.

When the softening temperature of the softener is less than the range shown above, sagging may occur during the foaming of the foaming composition for filling. On the other hand, when the softening temperature of the softener exceeds the range shown above, the polymer may not be able to be sufficiently softened, and the viscosity of the foaming composition for filling may not be able to be set within a desired range.

The blending proportion of the softener is adjusted appropriately in accordance with the MFR of the polymer, and is in a range of, e.g., 1 to 50 parts by weight, or preferably 5 to 25 parts by weight based on 100 parts by weight of the polymer.

When the blending proportion of the softener exceeds the range shown above, the viscosity of the foaming composition for filling measured with the flow tester excessively decreases to result in outgassing, and foaming may not be able to be reliably achieved.

To the foaming composition for filling of the present invention, known additives such as foaming auxiliary agent, other additional foaming agents (e.g., sulfonylhydrazide compound such as OBSH and azo compound other than ADCA such as azobisisobutyronitrile), processing aid, basic oxide, stabilizer, plasticizer, antioxidant, oxidation inhibitor, pigment, coloring agent, fungicide, and flame retardant may also added at an appropriate ratio in a range which does not inhibit the excellent effects of the present invention.

The foaming auxiliary agent is blended as necessary to efficiently cause foaming due to ADCA at a temperature (in a range of, e.g., 140 to 180° C., or preferably 160 to 180° C.) during the step of manufacturing a hollow member (specifically, during the baking finishing of an automobile). Examples of the foaming auxiliary agent include urea compounds, higher fatty acids such as salicylic acid and stearic acid or metal salts thereof (e.g., zinc salt), and metal oxides such as zinc oxide. In terms of storage stability, higher fatty acid zinc or zinc oxide produced by a dry method is preferably used.

The blending proportion of the foaming auxiliary agent based on 100 parts by weight of the polymer is in a range of, e.g., 1 to 20 parts by weight, or preferably 2 to 10 parts by weight.

In the foaming composition for filling of the present invention, the individual components shown above are blended in the blending proportions shown above, and uniformly mixed. The foaming composition for filling can be prepared by kneading the components shown above with, e.g., a mixing roll, a pressure kneader, an extruder, or the like.

Kneading conditions include a heating temperature in a range of, e.g., 50 to 130° C., or preferably 95 to 120° C., and a heating time in a range of, e.g., 0.5 to 30 minutes, or preferably 1 to 20 minutes.

In the preparation, the obtained kneaded product can also be molded into a predetermined shape, and prepared as a preform.

Molding of the kneaded product is performed by, e.g., molding the kneaded product directly into a predetermined shape (e.g., a sheet-like shape) by calender-molding or press-molding. Alternatively, the kneaded product is, e.g., pelletized using a pelletizer or the like, and molded into a predetermined shape using an injection molder or an extrusion molder.

Molding conditions include a molding temperature in a range of, e.g., 60 to 120° C., or preferably 75 to 105° C.

The foaming composition for filling thus obtained has a viscosity (measured at a temperature of 120° C. and under a pressure of 500 MPa with a flow tester) in the range of 1050 to 4950 Pa·s, or preferably 2500 to 3500 Pa·s.

Note that the viscosity of the foaming composition for filling is based on JIS K 7210, and measured with a capillary rheometer at a temperature of 120° C. and under a pressure of 500 MPa.

When the viscosity of the foaming composition for filling measured with the flow tester is less than the range shown above, during foaming, foam cells are broken due to the pressure of a foaming gas of azodicarbonamide to reduce the expansion ratio. As a result, an unfilled portion is formed in an inner space of a hollow member.

On the other hand, when the viscosity of the foaming composition for filling measured with the flow tester exceeds the range shown above, a coating of the polymer becomes excessively hard during foaming, and the foams for filling press each other, while the foams for filling are not sufficiently fusion-bonded to each other. As a result, an unfilled portion is formed in the inner space of the hollow member.

That is, by the viscosity of the foaming composition for filling measured with the flow tester being within the range shown above, the coating of the polymer during foaming can be formed appropriately soft. When a plurality of the foaming compositions for filling are placed, the foams for filling can be sufficiently fusion-bonded to each other without pressing (repelling) each other. Therefore, the filling property can be improved.

By heating the foaming composition for filling of the present invention thus obtained under appropriate conditions to foam, cross-link, and cure the foaming composition, the foam for filling of the present invention can be formed.

The foam for filling of the present invention thus obtained has a density (Foam Weight (g)/Foam Volume ($cm^3$)) in a range of, e.g., 0.04 to 0.2 g/$cm^3$, or preferably 0.05 to 0.08 g/$cm^3$, and a volume expansion ratio during foaming (Pre-Foaming Density/Post-Foaming Density) in a range of, e.g., not less than 10, or preferably 10 to 40. Such a volume expansion ratio allows a gap between members or an inner space of a hollow member to be filled (sealed) with the foam for filling with substantially no void space left therein even when the gap or the inner space has a complicated shape.

The foam for filling of the present invention thus obtained can give various effects such as reinforcement, vibration control, sound insulation, dust control, heat insulation, buffering, and watertightness. Therefore, the foam for filling of the present invention can be used appropriately as fillers for various industrial products such as, e.g., a reinforcement material, a vibration control material, a sound insulator, a dust control material, a heat insulator, a buffering material, and a water-stop material.

To fill a gap between various members or an inner space of a hollow member, the foaming composition for filling is placed in the gap between the members to be filled or in the inner space of the hollow member to be filled, and then heated to be foamed, cross-linked, and cured to form a foam for filling, with which the gap between the members or the inner space of the hollow member is filled, though the process thereof is not particularly limited.

More specifically, in the case of filling, e.g., the inner space of the hollow member, a fitting member is attached first to the foaming composition for filling to produce a foaming member for filling. The fitting member of the foaming member for filling is mounted in the inner space of the hollow member, and then foamed by heating to form the foam for filling, with which the inner space of the hollow member can be filled.

Examples of such a hollow member include an automotive pillar. If the foaming member for filling is produced from the foaming composition for filling of the present invention, mounted in the inner space of the pillar, and then foamed, the obtained foam for filling allows the vibration and noise of an engine, wind noise, and the like to be effectively prevented from being transmitted to a vehicle interior, while achieving sufficient reinforcement of the pillar.

FIG. 1 is a process step view of a method of filling an inner space of an automotive pillar using an embodiment of the foaming composition for filling, the foaming member for filling, and the foam for filling of the present invention.

Next, a description is given to the method of filling the inner space of the automotive pillar using the embodiment of the foaming composition for filling, the foaming member for filling, and the foam for filling of the present invention.

First, in the method, as shown in FIG. 1(a), a foaming composition for filling 1 molded into a predetermined shape is placed in a pillar 2.

The foaming composition for filling 1 is formed into, e.g., a sheet shape. Depending on the thickness thereof, the foaming composition for filling 1 is formed as necessary as a laminate sheet 1 including a plurality of laminated sheets.

The pillar 2 includes an inner panel 4 and an outer panel 5 each having a generally depressed cross-sectional shape. The inner panel 4 is formed such that a middle portion in a lateral direction (direction perpendicular to a vertical direction and a front-to-rear direction (direction of depth relative to the plane of paper with FIG. 1)) thereof protrudes from the both lateral end portions thereof with a generally rectangular shape (specifically generally a trapezoidal shape) to one side (lower side in FIG. 1) in the thickness direction of the pillar 2.

The outer panel 5 is formed such that a lateral middle portion thereof protrudes from the both lateral end portions thereof with a generally triangular shape to the other side (upper side in FIG. 1) in the thickness direction of the pillar 2.

Note that, in the middle portion of the inner panel 4, an engagement groove 8 into which a fitting member 3 is inserted is formed to extend through the inner panel 4 in the thickness direction (vertical direction) thereof.

To place the foaming composition for filling 1 in the pillar 2, the fitting member 3 is first attached to the foaming composition for filling 1 to produce a foaming member for filling 6 including the fitting member 3 and the foaming composition for filling 1. Subsequently, the fitting member 3 of the foaming member for filing 6 is attached to the inner side surface of the pillar 2.

To attach the fitting member 3 to the inner side surface of the pillar 2, for example, the fitting member 3 is inserted into the engagement groove 8 to be engaged therewith. In this case, the fitting member 3 can be insert-molded together with the kneaded product during the molding of the foaming composition for filling 1. Otherwise, the fitting member 3 can be formed of a suction disc, a magnet, or the like, and fixed by suction or magnetism, though not shown. It is also possible to form the fitting member 3 of a metal plate, and attach the fitting member 3 to the inner side surface of the pillar 2 by welding, though not shown.

After the foaming composition for filling 1 is placed in the inner panel 4 via the fitting member 3, the both lateral end portions of the inner panel 4 and the outer panel 5 are arranged to face and touch each other, and joined by tightening a tightening member 7 including a bolt and a nut. As a result, the pillar 2 is formed as a closed cross section. Note that, to join the inner panel 4 and the outer panel 5, instead of or in addition to tightening the tightening member 7 described above, welding can also be performed.

More specific examples of such a pillar 2 include a front pillar of a vehicle body, a side pillar thereof, and a rear pillar thereof.

Then, in the method, using heat in the subsequent dry line step during baking finishing, the pillar 2 is heated at a temperature in a range of, e.g., not less than 140° C. and not more than 180° C., or preferably not less than 160° C. and not more than 180° C. In this manner, as shown in FIG. 1(b), the foaming composition for filling 1 is foamed, cross-linked, and cured to be able to form a foam for filling 9, with which the inner space of the pillar 2 can be filled with substantially no void space left therein.

Note that the shape of the foaming composition for filling 1, the position and orientation where the foaming composition for filling 1 is placed, and the number of the foaming compositions for filling 1 to be placed are selectively and appropriately determined in accordance with the shape of the pillar 2 or the like.

Since the viscosity of such a foaming composition for filling 1 measured at a specified temperature and under a specified pressure with a flow tester is within a specified range, stable foaming can be achieved by heating.

This allows an excellent filling property to be given to the foaming member for filling 6 including the foaming composition for filling, and allows the inner space of the pillar 2 to be reliably and satisfactorily filled with the foam for filling 9 with substantially no void space left therein.

EXAMPLES

While in the following, the present invention will be described more specifically with reference to Examples and Comparative Examples, the present invention is not limited to any of them.

Examples 1-9, and Comparative Examples 1 and 2

In accordance with the blending formulation shown in Table 1, the individual components were kneaded using a 6-inch mixing roll at a rotation speed of 15 min$^{-1}$ and about 110° C. for 10 minutes to prepare kneaded products (foaming compositions for filling). Then, the prepared kneaded products were molded by pressing at 90° C. into sheets each having a thickness of 2 mm.

(Evaluation)

Each of the sheets obtained in Examples and Comparative Examples was individually evaluated for the following items. The result of the evaluation is shown in Table 1.

(1) Viscosity

The viscosity of each the sheets was measured based on JIS K 7210, specifically at a temperature of 120° C. and under a pressure of 500 MPa with a flow tester.

That is, in the flow tester (Model No. "CFT-500D", Capillary Rheometer available from Shimadzu Corporation), each of samples (foaming compositions for filling) cut out of the sheets was loaded in a die with a hole (extrusion hole) having an inner diameter of 1 mm and a length of 1 mm, and preheated at 120° C. for 180 seconds, while being pressed under a pressure of 500 MPa (under a load of 40 kg, i.e., 5093 kgf/cm$^2$). Then, by extruding the samples at the same temperature and under the same pressure as shown above, the viscosities of the foaming compositions for filling were measured.

(2) Expansion Ratio

The sheets were punched into discs each having a diameter of 19 mm to produce samples. Each of the produced samples was heated at 160° C. for 20 minutes to be foamed. Then, from the densities of the sheets before and after foaming, expansion ratios were calculated.

(3) Filling Property

First, as shown in FIG. 1(a), each of sheets (1) was cut into pieces each having a length (length in a lateral direction) of 80 mm and a width (length in a front-to-rear direction) of 15 mm. By laminating two cut pieces of the sheet (1), the laminate sheet (1) having a thickness of 4 mm was obtained.

Figure 2:
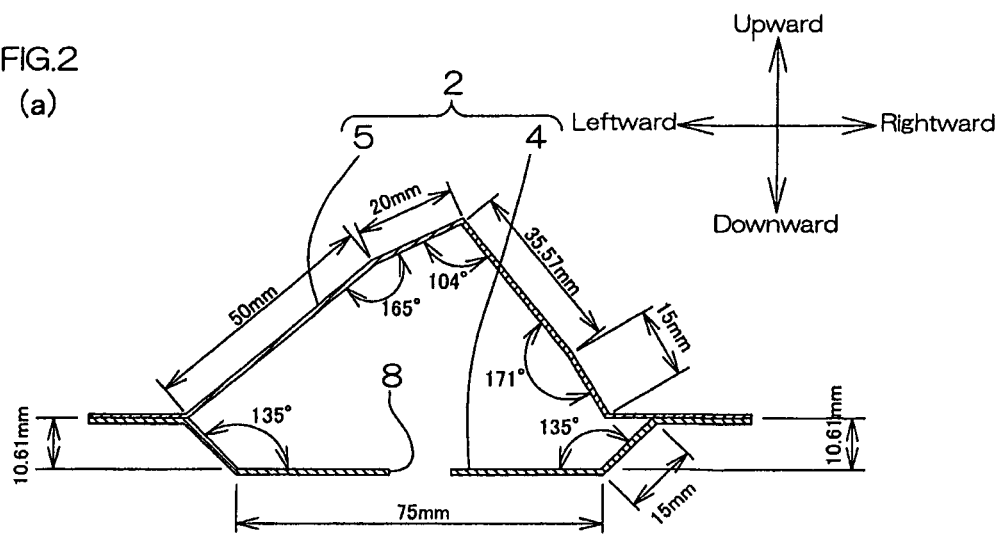
FIG. 2 shows a model pillar used for evaluation of a filling property in Examples, (a) showing a side cross-sectional view thereof, and
(b) showing a bottom view thereof.
Figure 2:
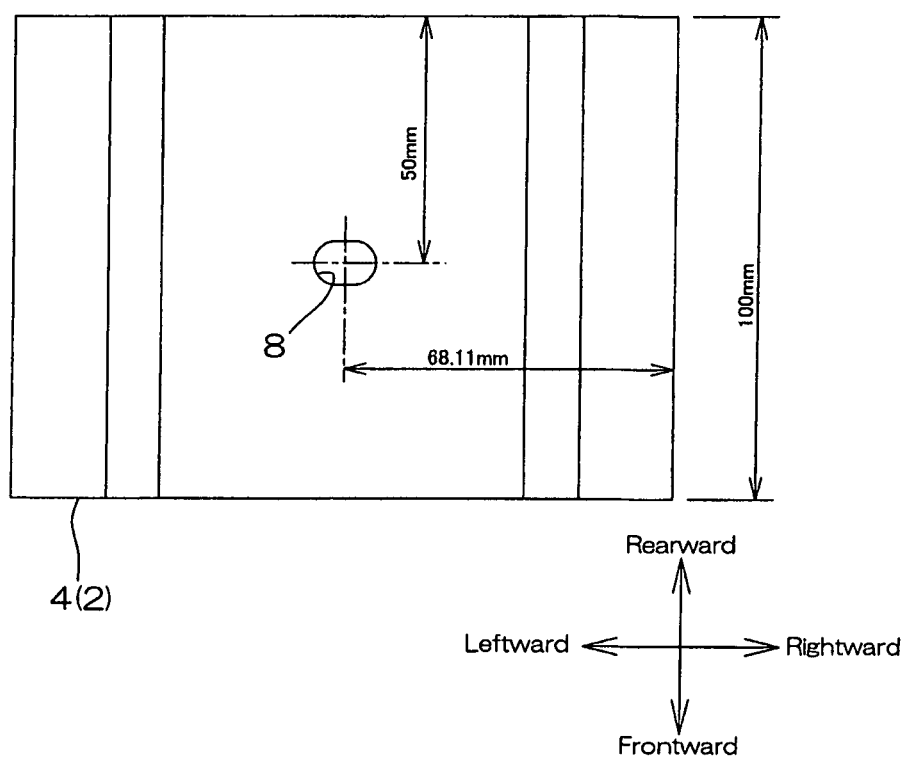

Meanwhile, an inner panel (4) and an outer panel (5) each formed to have the shape and the dimensions shown in FIG. 2(a) were prepared.

That is, the inner panel (4) was formed such that the lateral middle portion thereof protrudes downward with a generally trapezoidal shape, and an engagement groove (8) extends through the middle portion thereof. On the other hand, the outer panel (5) is formed such that the lateral middle portion thereof protrudes upward with a generally triangular shape.

Then, to the center of the laminate sheet (1) obtained by the process shown above, a clip (3) was attached, and then fit into the engagement groove (8) of the inner panel (4).

Then, the both lateral end portions of the inner panel (4) and the outer panel (5) were arranged to face and touch each other, and joined by tightening a tightening member (7) including a bolt and a nut. In this manner, a cylindrical model pillar (2) formed with a closed cross section, and having the sheet (1) mounted in the inner space thereof was produced.

Thereafter, as shown in FIG. 1(b), the produced model pillar (2) was heated at 160° C. for 20 minutes in an oven so that the laminate sheet (1) was foamed. With a foam for filling (9) thus obtained, the inner space of the model pillar (2) was filled.

Then, after cooling, the tightening member (7) was removed, the model pillar (2) was disassembled, and the filling property of the foam for filling (9) was visually evaluated based on the evaluation criteria shown below.

(Evaluation Criteria)
Exc.: Filling Property was Excellent
Poor: Void Space (Unfilled Portion) was Observed, and Filling Property was Slightly Poor

TABLE 1

| Blending Formulation of Foaming Composition for Filling | | MFR*14 (g/10 min) | Softening Temperature*15 (° C.) | Ex. 1 | Ex. 2 | Ex. 3 | Ex. 4 | Ex. 5 | Ex. 6 |
|---|---|---|---|---|---|---|---|---|---|
| Polymer | EVA*1 | 4.3 | — | 100 | 100 | — | — | 100 | 100 |
| | EVA*2 | 2.5 | — | — | — | 100 | 100 | — | — |
| | EVA*3 | 3 | — | — | — | — | — | — | — |
| Cross-Linking Agent (Organic Peroxide) | DCP*4 | | — | 5 | 5 | 5 | 5 | 5 | 5 |
| Foaming Agent | ADCA*5 | | — | 20 | 20 | 20 | 20 | 20 | 20 |
| Cross-Linking Auxiliary Agent ((Meth)Acryloyl-Group-Containing Compound) | TMPTA*6 | | — | 0.3 | 0.3 | 0.5 | 0.3 | — | — |
| | TMPTMA*7 | | — | — | — | — | — | 0.34 | — |
| | Number of Parts by Weight of Cross-Linking Auxiliary Agent Based on 100 Parts by Weight of Organic Peroxide | | | 6 | 6 | 10 | 6 | 6.8 | 0 |
| Softener | Terpene Polymer*8 | — | 115 ± 5 | 10 | — | 25 | — | — | — |
| | EVA*9 | 100 | (≤30)*17 | — | 20 | — | — | 20 | — |
| | Aliphatic Hydrocarbon Resin*10 | — | 100 | — | — | — | — | — | — |
| | Aliphatic/Aromatic Hydrocarbon Resin*11 | — | 95 | — | 20 | — | — | 20 | — |
| Foaming Auxiliary Agent | Zinc Oxide*12 | | — | 5 | 5 | 5 | 5 | 5 | 5 |
| | Zinc Stearate*13 | | — | 5 | 5 | 5 | 5 | 5 | 5 |
| Evaluation | Viscosity of Sheet*16 (Flow Tester: 120° C., 500 MPa) | | (Pa · s) | 3330 | 2730 | 1090 | 3950 | 2850 | 3227 |
| | Expansion Ratio | | (Value) | 29.0 | 27.2 | 23.9 | 25.9 | 25.8 | 23.5 |
| | Filling Property of Foam for Filling | | | Exc. | Exc. | Exc. | Exc. | Exc. | Exc. |

| Blending Formulation of Foaming Composition for Filling | | MFR*14 (g/10 min) | Softening Temperature*15 (° C.) | Ex. 7 | Ex. 8 | Ex. 9 | Comp. Ex. 1 | Comp. Ex. 2 |
|---|---|---|---|---|---|---|---|---|
| Polymer | EVA*1 | 4.3 | — | 100 | — | 100 | — | 100 |
| | EVA*2 | 2.5 | — | — | — | — | 100 | — |
| | EVA*3 | 3 | — | — | 100 | — | — | — |
| Cross-Linking Agent (Organic Peroxide) | DCP*4 | | — | 5 | 5 | 5 | 5 | 5 |
| Foaming Agent | ADCA*5 | | — | 20 | 20 | 20 | 20 | 20 |
| Cross-Linking Auxiliary Agent ((Meth)Acryloyl-Group-Containing Compound) | TMPTA*6 | | — | 0.025 | 0.3 | 0.5 | 2 | 0.3 |
| | TMPTMA*7 | | — | — | — | — | — | — |
| | Number of Parts by Weight of Cross-Linking Auxiliary Agent Based on 100 Parts by Weight of Organic Peroxide | | | 0.5 | 6 | 10 | 40 | 6 |
| Softener | Terpene Polymer*8 | — | 115 ± 5 | — | — | — | — | 30 |
| | EVA*9 | 100 | (≤30)*17 | — | — | — | — | — |
| | Aliphatic Hydrocarbon Resin*10 | — | 100 | — | — | 15 | — | — |
| | Aliphatic/Aromatic Hydrocarbon | — | 95 | — | — | 20 | — | — |

TABLE 1-continued

| | | | | | | | |
|---|---|---|---|---|---|---|---|
| | Resin*11 | | | | | | |
| Foaming | Zinc Oxide*12 | — | 5 | 5 | 5 | 5 | 5 |
| Auxiliary Agent | Zinc Stearate*13 | — | 5 | 5 | 5 | 5 | 5 |
| Evaluation | Viscosity of Sheet*16 (Flow Tester: 120° C., 500 MPa) | (Pa·s) | 3301 | 2064 | 1540 | 4980 | 1000 |
| | Expansion Ratio | (Value) | 26.3 | 26.2 | 26.3 | 27.2 | 21.3 |
| | Filling Property of Foam for Filling | | Exc. | Exc. | Exc. | Poor | Poor |

Note that the values in Table I show the respective numbers of parts by weight of the individual components unless otherwise specified.

In Table 1, the compounds and the measurement methods each followed by the mark "*" are described below in detail.

EVA*1: Ethylene-vinyl acetate copolymer available from Tosoh Corporation under the trade name of "ULTRACEN 634" (MFR: 4.3 g/10 min, VA content: 26 wt %)

EVA*2: Ethylene-vinyl acetate copolymer available from Mitsui-Du Pont Polychemicals Co., Ltd. under the trade name of "EVAFLEX EV460" (MFR: 2.5 g/10 min, VA content: 19 wt %)

EVA*3: Ethylene-vinyl acetate copolymer available from Tosoh Corporation under the trade name of "Ultracen 626" (MFR: 3 g/10 min, VA content: 15 wt %)

DCP*4: Dicumyl peroxide available from NOF Corporation Co., Ltd. under the trade name of "PERCUMYL D-40 MBK" (DCP content: 40%, silica+EPDM content: 60 wt %, 1-minute half-life temperature: 175° C.)

ADCA*5: Azodicarbonamide available from Eiwa Chemical Industrial Co., Ltd. under the trade name of "Vinyhole AC#3C"

TMPTA*6: Trimethylol propane triacrylate available from Osaka Organic Chemical Industry Ltd. under the trade name of "TMP3A"

TMPTMA*7: Trimethylol propane trimethacrylate available from Shin-Nakamura Chemical Co., Ltd. under the trade name of "TMPT"

Terpene Polymer*8: available from Yasuhara Chemical Co., Ltd. under the trade name of "YS Resin PX1150" (Softening Temperature measured by ring and ball method at temperature rising rate of 5° C./min: 115±5° C.)

EVA*9: Ethylene-vinyl acetate copolymer available from Mitsui-Du Pont Polychemicals Co., Ltd. under the trade name of "EVAFLEX EV45X" (MFR: 100 g/10 min, Softening Temperature measured according to JIS K 7206: not more than 30° C., VA content: 46 wt %)

Aliphatic Hydrocarbon Resin*10: available from Nippon Zeon Co., Ltd. under the trade name of "Quintone G 100B" (Softening Temperature measured by ring and ball method at temperature rising rate of 5° C./min: 100° C.)

Aliphatic/Aromatic Hydrocarbon Resin*11: available from Tosoh Corporation under the trade name of "Petrotack 90" (Softening Temperature measured by ring and ball method at temperature rising rate of 5° C./min: 95° C.)

Zinc Oxide*12: available from Mitsui Mining & Smelting Co., Ltd. under the trade name of "Zinc Oxide #2"

Zinc Stearate*13: available from Sakai Chemical Industry Co., Ltd. under the trade name of "SZ-P"

MFR*14: Based on JIS K 7210
Softening Temperature*15: Based on JIS K 2207
Viscosity*16: Based on JIS K 7210
Softening Temperature*17: Based on JIS K 7206

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A foaming composition for filling which is used to fill an inner space of a hollow member, containing:
a polymer;
an organic peroxide;
azodicarbonamide; and
a softener, wherein
a melt flow rate of the polymer measured based on JIS K 7210 is in a range of not less than 1.0 g/10 min and not more than 5.0 g/10 min,
a blending proportion of the softener is adjusted in accordance with the melt flow rate of the polymer, and is in a range of 10 to 25 parts by weight based on 100 parts by weight of the polymer, and
the foaming composition for filling has a viscosity measured at a temperature of 120° C. and under a pressure of 500 MPa with a flow tester in a range of 1050 to 4950 Pa·s.

2. The foaming composition for filling according to claim 1, further containing:
1 to 20 parts by weight of a (meth)acryloyl-group-containing compound having at least three (meth)acryloyl groups based on 100 parts by weight of the organic peroxide.

3. A foaming member for filling which is used to fill an inner space of a hollow member, comprising:
a foaming composition for filling; and
a fitting member attached to the foaming composition for filling, with at least a portion of the fitting member being operative to be mounted in an inner space of a hollow member, wherein
the foaming composition for filling contains a polymer, an organic peroxide, azodicarbonamide, and a softener, wherein a melt flow rate of the polymer measured based on JIS K 7210 is in a range of not less than 1.0 g/10 min and not more than 5.0 g/10 min, a blending proportion of the softener is adjusted in accordance with the melt flow rate of the polymer, and is in a range of 10 to 25 parts by weight based on 100 parts by weight of the polymer, and the foaming composition for filling has a viscosity in a range of 1050 to 4950 Pa·s, which is measured at a temperature of 120° C. and under a pressure of 500 MPa with a flow tester.

4. A foam for filling which is used to fill an inner space of a hollow member and which is obtained by foaming a foaming composition for filling containing a polymer, an organic peroxide, azodicarbonamide, and a softener, wherein a melt flow rate of the polymer measured based on JIS K 7210 is in a range of not less than 1.0 g/10 min and not more than 5.0 g/10 min, a blending proportion of the softener is adjusted in accordance with the melt flow rate of the polymer, and is in a range of 10 to 25 parts by weight based on 100 parts by weight of the polymer, and the foaming composition for filling has a viscosity in a range of 1050 to 4950 Pa·s, which is measured at a temperature of 120° C. and under a pressure of 500 MPa with a flow tester.

5. A foaming composition for filling containing:
a polymer;
an organic peroxide; and
azodicarbonamide, wherein
a viscosity measured at a temperature of 120° C. and under a pressure of 500 MPa with a flow tester is in a range of 2500 to 3500 Pa·s,
a melt flow rate of the polymer measured based on JIS K 7210 is in a range of not less than 1.0 g/10 min and not more than 5.0 g/10 min,
10 to 25 parts by weight of a softener based on 100 parts by weight of the polymer is further contained, and
1 to 6.8 parts by weight of a (meth)acryloyl-group-containing compound having at least three (meth)acryloyl groups based on 100 parts by weight of the organic peroxide is further contained.

6. The foaming composition for filling according to claim 5, containing no flame retardant.

* * * * *